Figure 5:
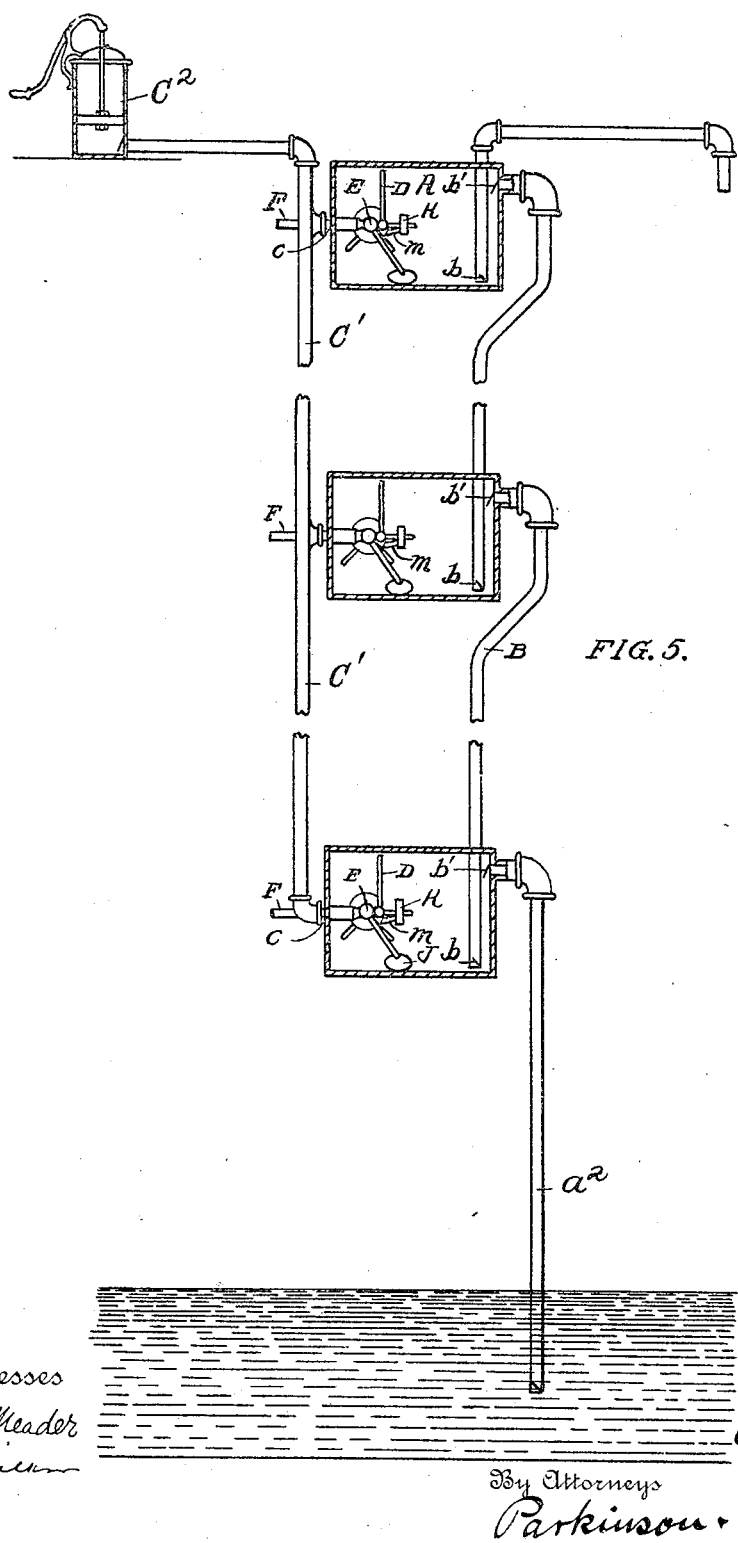

No. 808,218. PATENTED DEC. 26, 1905.
G. REITER.
APPARATUS FOR ELEVATING FLUIDS.
APPLICATION FILED APR. 14, 1903.
4 SHEETS—SHEET 1.
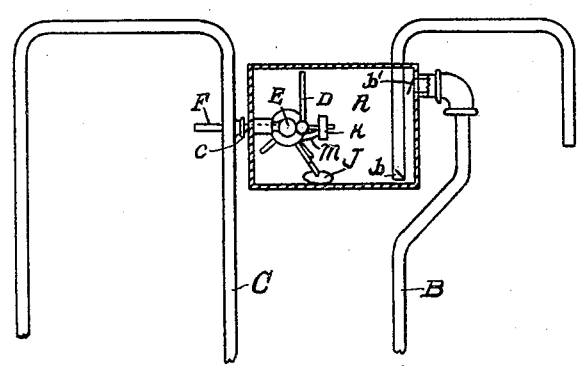
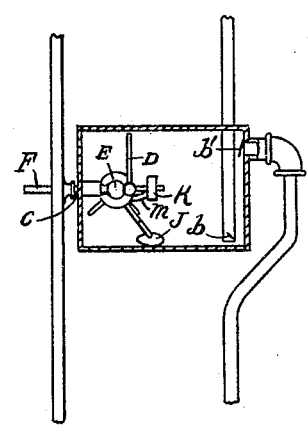
FIG. 1.
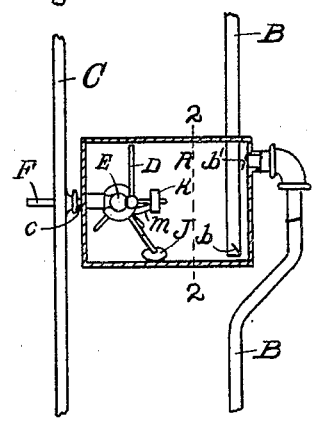
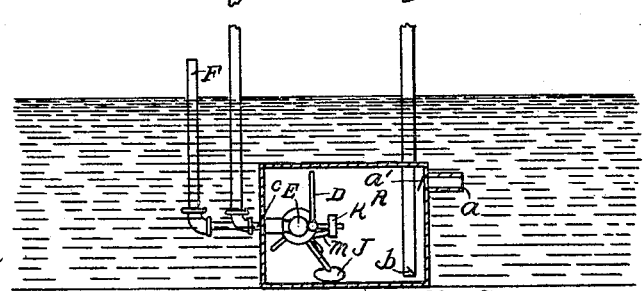
Witnesses
Thos. W. Meader
H. J. H_____
Inventor
George Reiter
By Attorneys
Parkinson + Richards

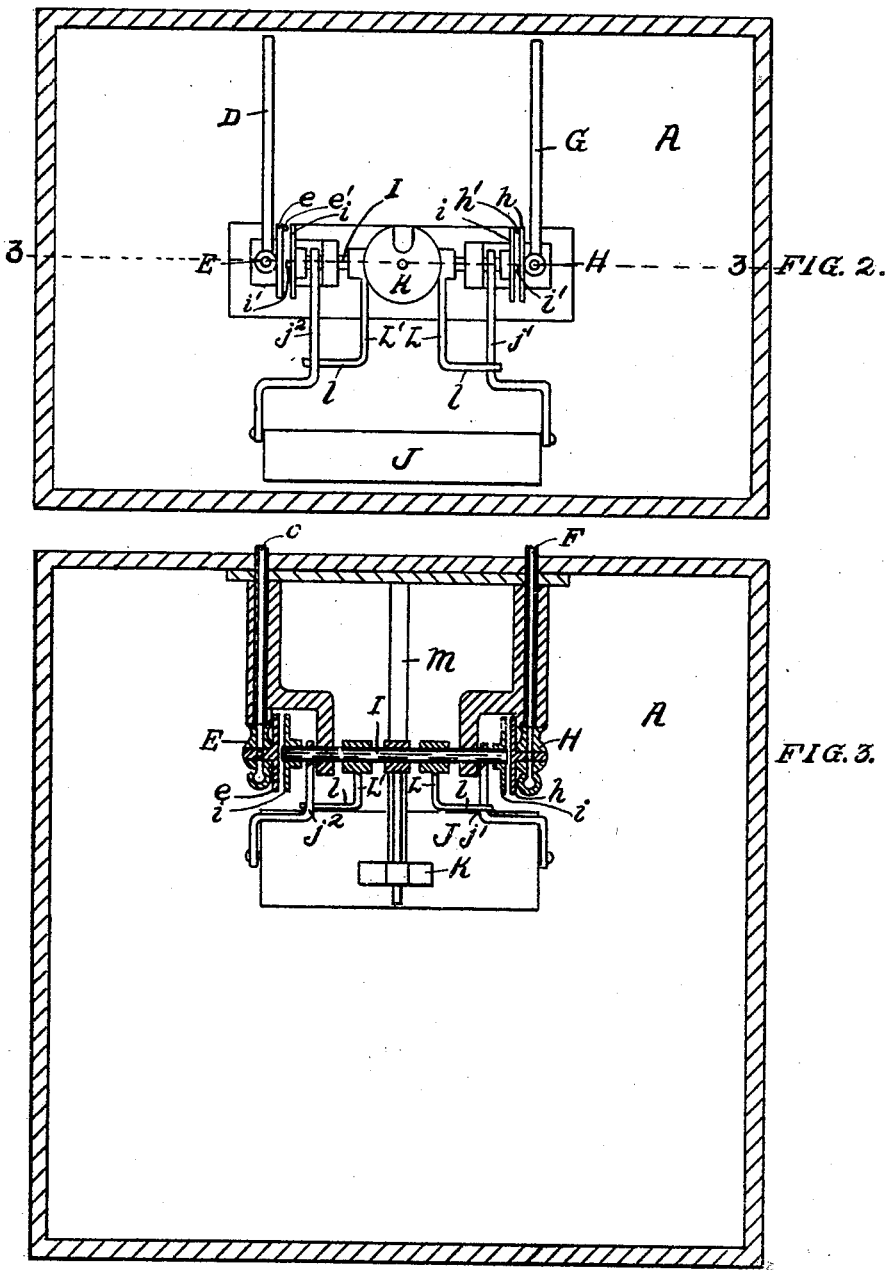

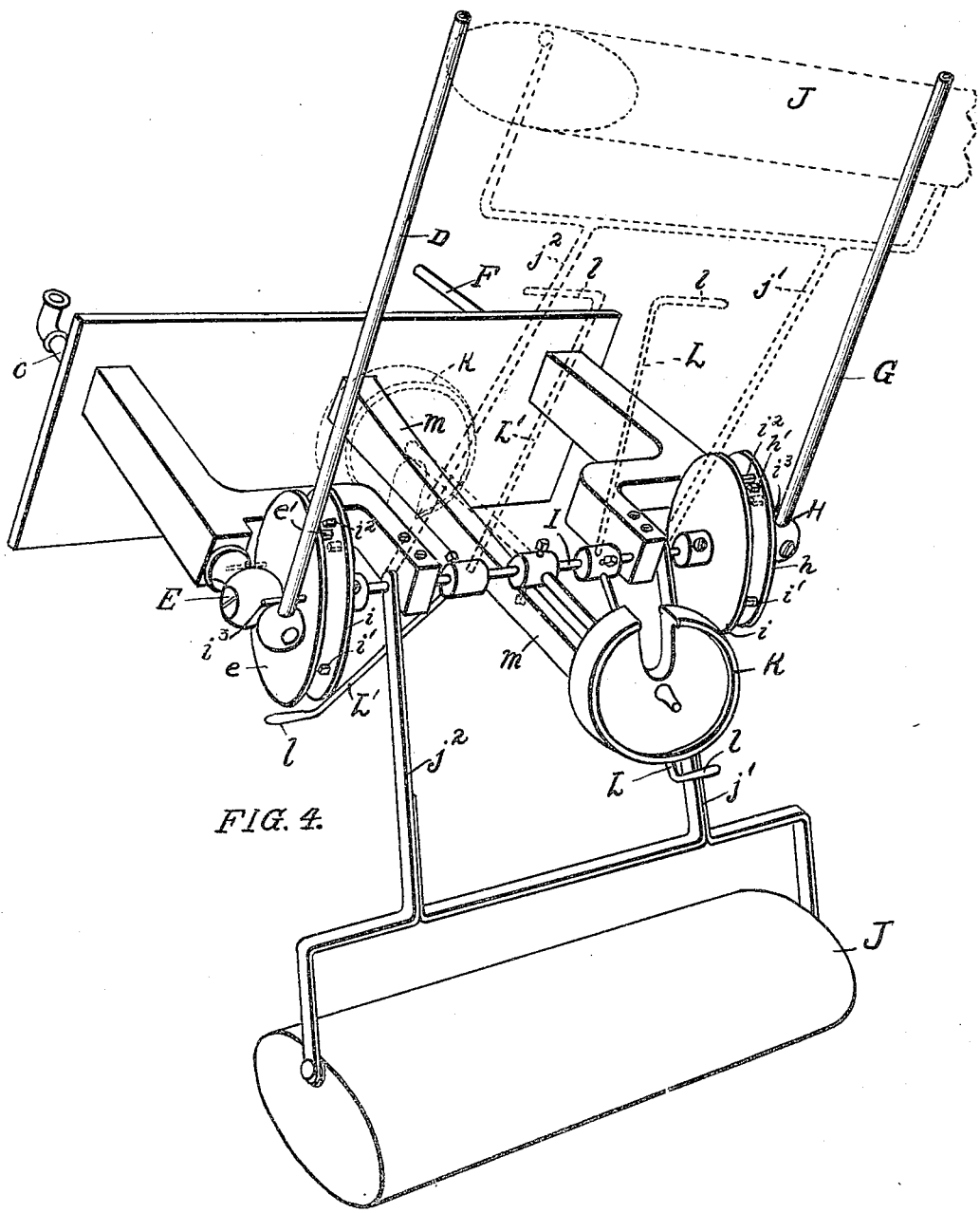

No. 808,218. PATENTED DEC. 26, 1905.
G. REITER.
APPARATUS FOR ELEVATING FLUIDS.
APPLICATION FILED APR. 14, 1903.

4 SHEETS—SHEET 4.

Witnesses
Theo. W. Meader
H. J. Hill

Inventor
George Reiter
By Attorneys
Parkinson & Richards

UNITED STATES PATENT OFFICE.

GEORGE REITER, OF PLEASANTRIDGE, OHIO.

APPARATUS FOR ELEVATING FLUIDS.

No. 808,218.   Specification of Letters Patent.   Patented Dec. 26, 1905.

Application filed April 14, 1903. Serial No. 152,522.

*To all whom it may concern:*

Be it known that I, GEORGE REITER, a citizen of the United States, residing at Pleasantridge, in the county of Hamilton and State of Ohio, have invented certain new and useful Improvements in Apparatus for Elevating Fluids, of which the following is a specification.

The object of my invention is to provide an improved apparatus for elevating fluids; and the invention consists in the combinations and arrangements of parts hereinafter described and claimed.

In the drawings, Figure 1 is a sectional elevation of apparatus embodying my invention; Fig. 2, a section on line 2 2 of Fig. 1; Fig. 3, a section on line 3 3 of Fig. 2; Fig. 4, a perspective view of the valve-operating mechanism, and Fig. 5, a sectional elevation of a modified form of application of my invention.

Referring to the apparatus illustrated in Figs. 1, 2, 3, and 4 of the drawings, reference-letter A denotes a series of tanks arranged at successively higher elevations. The lowest of tanks A is set in the water or other fluid to be elevated or is in communication therewith. A pipe $a$, provided with a check-valve $a'$, serves to admit water to tank A. A system of pipes B, having their lower ends near the bottoms of tanks A and provided with check-valves $b$ and having their upper ends opening into the upper portions of tanks A and provided with check-valves $b'$, connect the tanks A. Compressed air is furnished to the upper portions of tanks A through a pipe C, having a branch pipe $c$ communicating with pipe D through a valve E, and each tank A has an exhaust-pipe F opening into the atmosphere and in communication with pipe G through valve H. The valves E and H each carry, respectively, a disk $e$ and $h$, provided, respectively, with a stop $e'$ and $h'$. A shaft I is rotatably mounted between disks $e$ and $h$ and carries at either end a disk $i$, provided with stops $i'$ and $i^2$, adapted to engage stops $e'$ and $h'$ on disks $e$ and $h$. Stop-pins $i^3$ are provided to limit the movement of disks $i$. The shaft I is operated by means of a float J, which is mounted on arms $j'$ and $j^2$ to swing relatively to shaft I. A weight K is attached to shaft I, and stop-arms L and L' are attached to shaft I with their bent ends $l$ lying in the path of arms $j'$ and $j^2$. A beam $m$ serves as a rest to stop weight K on either side of shaft I.

In operation compressed air or other gas under pressure is supplied to pipe C from any suitable source. (Not shown.) The valves and the valve-operating mechanism are set so that valve E is closed and valve H open, with the float J in the position shown in Fig. 4. Water flows into the lowest tank A through pipe $a$, valve H acting as an exhaust-valve to permit the escape of the air in tank A, and the float J is carried upwardly on the surface of the water coming into the tank. As the float rises, arm $j'$ engages the bent end of stop-arm L and causes shaft I to rotate with float J. The rotation of shaft I raises weight K. When weight K passes the vertical through shaft I, it falls over the other side of the shaft and continues the rotation of the shaft. At this time stops $i'$ have moved up to engage stops $e'$ and $h'$ on disks $e$ and $h$, so that the fall of weight K rotates disks $e$ and $h$ to open valve E and close valve H simultaneously. Thus compressed air is admitted from pipe C to the upper portion of tank A, and the communication of tank A with the atmosphere is shut off. The pressure of the compressed air drives the water in tank A up through the pipe B into the tank A next above. Here the same operation takes place. As the water fills the upper tank the air is permitted to escape through valve H; but as soon as the weight falls over shaft I valve E is opened, valve H closed, and the water forced to the next tank, and so on through the system until the water is raised to any desired elevation, depending on the number of tanks and their vertical distance apart. The check-valves $b$ and $b'$ serve to retain the water in pipes B during the filling of the tanks. As soon as the water-level in a tank begins to fall as the water is forced to the next tank above the float J falls with it. The previous fall of weight K having carried stop-arm L' around to engage arm $j^2$, the fall of float J carries shaft I with it, and consequently raises weight K. As weight K again passes the vertical it again falls to continue the rotation of shaft I. By this time stops $i^2$ have moved back to engagement with stops $e'$ and $h'$, so that the fall of weight K closes valve E and opens valve H, leaving the water free to enter the tank again, as before. The beam $m$ limits the fall of weight K on either side of shaft I, and stop-pins $i^3$ limit the movement of disks $i$ to that necessary to open and close valves E and H. Thus the tanks A will be alternately filled and emptied until the water reaches the uppermost tank, when it may be discharged at that level. It will be noted that with this apparatus fluids may be elevated to any desired height by the use of a moderate degree of pressure. Owing to the fact that the valves in each tank operate independently of the valves in the other tanks and through the medium of the local conditions in each tank, nice adjustment of the parts is avoided, and the action of each tank is automatically delayed or expedited to meet the conditions in each tank separately. It will be noted that the fall of weight K will fully open and close both valves E and H irrespective of the change in conditions in the tanks.

While I have shown the operative connections between float J and the weight K and valves E and H, as located in the tanks, it is obvious that these parts may be located outside the tanks and suitable connections provided between the float J inside the tanks and weight K and valve E and H outside the tank or some of the operative connections may be inside and others outside the tanks.

The vertical distance between each tank A is limited by the pressure employed in pipe C, being a little less than the height of a column of water which the pressure will support. Atmospheric pressure will support a column of water about thirty-three feet high, so that if the pressure employed in pipe C was something over three atmospheres the tanks A could be placed one hundred feet above each other, although the greater the excess of pressure over that necessary to support the column the greater the speed of flow between the tanks.

In Fig. 5 I have illustrated a modified form of application of my invention, in which a suction-pump as distinguished from a compressor may be utilized. Here the pipe C' is equipped with an ordinary pump C², which serves to exhaust the air in pipe C'. The other connections and operative parts are the same as in the former example except that the lowest tank A is not submerged in the water to be elevated, but is elevated and connected with the water by a pipe $a^2$. Valve E is set open in the position shown in Fig. 5, and valve H is set closed. Here operation of pump C² exhausts the air from pipe C' and tanks A. As the air is exhausted from the lowest tank A atmospheric pressure forces water up through pipe $a^2$ to take its place and fill the tank. When the tank is almost full, float J operates to close valve E and open valve H. This admits atmospheric pressure to this tank, and as the next tank above is already partially exhausted of its air and pump C² continues to exhaust it further the water from the lower tank is forced into the next upper tank by the atmospheric pressure. Here the same operations are repeated to force the water into the next tank above, and so on to the top of the system. As soon as the lowest tank is emptied of its water the float operates to open valve E and close valve H, so that the tank is again exhausted while the second lowest is emptying. Approximately by the time that the second tank is emptied into the third the first is full again, and so on up the system every other tank will be filling and every other tank emptying. Thus the water may be raised to any desired height by the use of a suction-pump.

The vertical distance between tanks A is limited by the pressure exerted by the atmosphere, being somewhat less than the column of water supported by atmospheric pressure. Atmospheric pressure will support a column of water about thirty-three feet high, so that the tanks A in this instance might be placed, for example, twenty-five feet apart, although the closer they are together the faster will be the flow between them.

It will be noted that the utilization of a suction-pump is but a different application of the same principle that underlies the use of the compressor. In both cases pressure is utilized—with the suction-pump atmospheric pressure, with the compressor compressed-air pressure—such changes being made in operation of the apparatus as to adapt it to the maintenance and utilization of the particular form of pressure employed.

If desired, one of the tanks A and its operative parts may be utilized for a single elevation of fluid; but in this case the elevation obtainable will not be over the height of a column of water which the pressure employed will sustain.

While I have shown and described the preferred form of application of my invention, this is capable of many variations without departing from the spirit of the invention. I therefore do not wish to be limited to the exact form of apparatus shown; but

What I claim as new, and desire to secure by Letters Patent, is—

1. The combination of tanks A; pipes B connecting the lower portions of the lower tanks with the upper portions of the upper tanks; pipes C containing gas under pressure; pipes c and D, and F and G, connecting the upper portions of tanks A with pipes C and the atmosphere; valves E and H; float J in tanks A; and connections between float J and valves E and H for opening valve E and closing valve H when the tanks are charged, and for opening valve H and closing valve E when the tanks are discharged, substantially as specified.

2. The combination of tanks A; pipes B connecting the lower portions of the lower tanks with the upper portions of the upper tanks; check-valves $b$ and $b'$; pipe C containing gas under pressure; pipes $c$ and D, and F and G, connecting the upper portions of tanks A with pipe C and the atmosphere; valves E and H; float J in tanks A; and connections between float J and valves E and H for opening valve E and closing valve H when the tanks are charged, and for opening valve H and closing valve E when the tanks are discharged, substantially as specified.

3. The combination of tanks A; pipes B connecting the lower portions of the lower tanks with the upper portions of the upper tanks; check-valves $b$ and $b'$; pipe C containing gas under pressure; pipes $c$ and D, and F and G, connecting the upper portions of tanks A with pipe C and the atmosphere; valves E and H; float J mounted on arms $j'$ and $j^2$; shaft I having stop-arms L and L' engaging arms $j''$ and $j^2$; weight K on shaft I; disks $i$ having stops $i''$ and $i^2$ and stop-pins $i^3$; and disks $e$ and $h$ having stops $e'$ and $h'$, substantially as specified.

4. The combination, in a float-operated mechanism, of valves E and H; float J mounted on arms $j'$ and $j^2$; shaft I having arms L and L' adapted to engage arms $j''$ and $j^2$; weight K on shaft I; and connections between shaft I and valves E and H, substantially as specified.

5. The combination, in a float-operated mechanism, of valves E and H; float J mounted on arms $j'$ and $j^2$; shaft I having arms L and L' adapted to engage arms $j''$ and $j^2$; weight K on shaft I; disks $e$ and $h$ on valves E and H; stops $e'$ and $h'$ on disks $e$ and $h$; disks $i$ on shaft I; and stops $i'$ and $i^2$ on disks $i$, substantially as specified.

GEORGE REITER.

Witnesses:
EVELYN ASH,
BRAYTON G. RICHARDS.